United States Patent
Endal et al.

(10) Patent No.: US 10,520,112 B2
(45) Date of Patent: Dec. 31, 2019

(54) PIPELINE METHOD AND APPARATUS

(71) Applicant: Statoil Petroleum AS, Stavanger (NO)

(72) Inventors: Geir Endal, Jessheim (NO); Jens Haugen, Eiksmarka (NO)

(73) Assignee: STATOIL PETROLEUM AS, Stavanger (NO)

( * ) Notice: Subject to any disclaimer, the term of this patent is extended or adjusted under 35 U.S.C. 154(b) by 0 days.

(21) Appl. No.: 15/546,225

(22) PCT Filed: Feb. 22, 2016

(86) PCT No.: PCT/NO2016/050029
§ 371 (c)(1),
(2) Date: Jul. 25, 2017

(87) PCT Pub. No.: WO2016/137332
PCT Pub. Date: Sep. 1, 2016

(65) Prior Publication Data
US 2018/0010713 A1 Jan. 11, 2018

(30) Foreign Application Priority Data
Feb. 24, 2015 (GB) .................................. 1503071.1

(51) Int. Cl.
*F16L 1/12* (2006.01)
*F16L 1/23* (2006.01)
(Continued)

(52) U.S. Cl.
CPC ................ *F16L 1/163* (2013.01); *F16L 1/23* (2013.01); *F16L 1/24* (2013.01)

(58) Field of Classification Search
CPC ..... E02F 5/104; F16L 1/00; F16L 1/12; F16L 1/26; F16L 1/23; F16L 1/24; E21B 43/0107
(Continued)

(56) References Cited

U.S. PATENT DOCUMENTS 1,757,151 A * 5/1930 Sunt .......................... B63G 8/41
114/327
3,060,463 A * 10/1962 Pentzien ................. B63B 35/34
114/292
(Continued)

FOREIGN PATENT DOCUMENTS

GB 1 559 657 1/1980
GB 2 267 945 A 12/1993
(Continued)

OTHER PUBLICATIONS

International Search Report issued in PCT/NO2016/050029 (PCT/ISA/210), dated May 24, 2016.
(Continued)

*Primary Examiner* — Benjamin F Fiorello
*Assistant Examiner* — Edwin J Toledo-Duran
(74) *Attorney, Agent, or Firm* — Birch, Stewart, Kolasch & Birch, LLP (57) ABSTRACT

A method and apparatus are provided for laying pipelines. The apparatus is attached to a portion of a pipeline and includes a tensioning member and a buoyancy element attached to a mid-portion of the tensioning member. When the buoyancy element is submerged, the buoyancy force tensions the tensioning member, and the pipeline will take the intended deflected shape to follow seabed depressions.

20 Claims, 6 Drawing Sheets

(51) Int. Cl.
*F16L 1/26* (2006.01)
*F16L 1/16* (2006.01)
*F16L 1/24* (2006.01)

(58) Field of Classification Search
USPC .......................................... 405/154, 158–173
See application file for complete search history.

(56) References Cited

U.S. PATENT DOCUMENTS

| | | | | |
|---|---|---|---|---|
| 3,173,271 A * | 3/1965 | Wittgenstein | ............. | F16L 1/14 405/172 |
| 3,330,123 A * | 7/1967 | Brewer | ................... | B63B 35/04 405/171 |
| 3,378,067 A * | 4/1968 | Leonard | ............... | E21B 17/015 166/350 |
| 3,482,410 A * | 12/1969 | Gentry | ............... | E21B 43/0135 405/169 |
| 3,543,526 A * | 12/1970 | Krasberg | ................ | B63C 11/44 405/193 |
| 3,641,602 A * | 2/1972 | Flory | .................... | B63B 22/021 441/5 |
| 3,698,348 A * | 10/1972 | Morgan | .................. | F16L 1/165 114/245 |
| 3,744,258 A * | 7/1973 | Lochridge | ............ | B23K 9/0061 405/169 |
| 3,835,655 A * | 9/1974 | Oliver | ................ | E21B 43/0107 405/170 |
| 3,835,656 A * | 9/1974 | McDermott | ............. | B63C 7/10 405/170 |
| 3,893,305 A * | 7/1975 | Walker | .................... | B21D 7/10 405/168.1 |
| 4,011,729 A * | 3/1977 | Kermel | .................. | F16L 1/165 405/158 |
| 4,014,478 A * | 3/1977 | Bonacina | ................ | B63B 22/00 242/379 |
| 4,062,198 A * | 12/1977 | Lamy | ...................... | F16L 1/165 405/171 |
| 4,075,862 A * | 2/1978 | Ames | .................... | E21B 43/013 166/343 |
| 4,098,214 A * | 7/1978 | Ogura | ................... | B63B 22/00 114/230.2 |
| 4,107,802 A * | 8/1978 | Patinet | .................... | F16L 1/165 248/62 |
| 4,110,994 A * | 9/1978 | Lundh | .................... | B63B 21/50 405/158 |
| 4,132,084 A * | 1/1979 | Francisco-Arnold | ..... | F16L 1/14 174/101.5 |
| 4,135,844 A * | 1/1979 | Lamy | .................... | F16L 1/163 405/171 |
| 4,225,270 A * | 9/1980 | Dareing | .............. | E21B 43/0135 166/346 |
| 4,254,728 A * | 3/1981 | Patinet | ................ | E21B 43/0135 114/230.15 |
| 4,263,004 A * | 4/1981 | Joubert | ................. | E21B 17/015 405/171 |
| 4,271,550 A * | 6/1981 | Joubert | ................... | E02D 29/06 114/242 |
| 4,399,601 A * | 8/1983 | Ayers | ..................... | B63B 21/60 29/407.08 |
| 4,704,049 A * | 11/1987 | Vilain | ..................... | F16L 1/14 405/158 |
| 4,909,670 A * | 3/1990 | Harrison | .................. | F16L 1/16 254/134.3 SC |
| 5,275,510 A * | 1/1994 | de Baan | .................... | F16L 1/16 405/168.1 |
| 5,575,590 A * | 11/1996 | Drost | ...................... | F16L 1/163 405/166 |
| 5,683,204 A * | 11/1997 | Lawther | .................... | F16L 1/16 405/158 |
| 6,415,828 B1 * | 7/2002 | Duggal | ................. | B63B 22/021 141/279 |
| 6,558,215 B1 * | 5/2003 | Boatman | ............... | B63B 21/508 114/230.13 |
| 6,700,835 B1 * | 3/2004 | Ward | ...................... | G01B 5/004 367/131 |
| 7,789,588 B2 * | 9/2010 | De Aquino | ........... | E21B 17/015 405/216 |
| 8,622,137 B2 * | 1/2014 | Childres | ................ | E21B 19/002 166/338 |
| 8,708,602 B2 * | 4/2014 | Critsinelis | .................. | F16L 1/24 405/158 |
| 9,534,452 B2 * | 1/2017 | Hatton | ................... | E21B 17/015 |
| 9,797,526 B2 * | 10/2017 | Zhang | ..................... | F16L 1/235 |
| 2003/0221602 A1 * | 12/2003 | Guinn | ................... | E21B 19/002 114/258 |
| 2004/0062611 A1 * | 4/2004 | Endal | ....................... | F16L 1/18 405/168.1 |
| 2006/0062635 A1 * | 3/2006 | Mungall | ................... | F16L 1/14 405/158 |
| 2006/0067792 A1 * | 3/2006 | Joshi | ....................... | F16L 1/163 405/171 |
| 2008/0232905 A1 * | 9/2008 | Duroch | .................... | F16L 1/201 405/168.2 |
| 2008/0317555 A1 * | 12/2008 | De Aquino | ........... | E21B 17/015 405/195.1 |
| 2011/0033244 A1 * | 2/2011 | Pollack | ................... | B63B 27/24 405/168.4 |
| 2014/0338919 A1 * | 11/2014 | Pionetti | ................. | E21B 17/015 166/352 |
| 2016/0101831 A1 * | 4/2016 | Hoogeveen | ........... | B63B 21/502 441/3 |
| 2017/0074424 A1 * | 3/2017 | Tinoco | ....................... | F16L 1/20 |
| 2018/0010713 A1 * | 1/2018 | Endal | ...................... | F16L 1/163 |

FOREIGN PATENT DOCUMENTS

| | | |
|---|---|---|
| GB | 2492414 A | 1/2013 |
| NO | 314056 B1 | 1/2003 |
| WO | WO 02/057674 A1 | 7/2002 |
| WO | WO 2011/008593 A1 | 1/2011 |
| WO | WO 2015/149843 A1 | 10/2015 |

OTHER PUBLICATIONS

United Kingdom Search Report issued in GB1503071.1, dated Oct. 23, 2015.
Written Opinion of the International Searching Authority issued in PCT/NO2016/050029 (PCT/ISA/237), dated May 24, 2016.

* cited by examiner

PIPELINE METHOD AND APPARATUS

FIELD OF THE INVENTION

The invention relates to pipeline technology.

BACKGROUND

Submarine pipelines laid on the seabed are usually either embedded in trenches or laid unburied on the seabed. In the latter case, due to uneven seabed topography and surface depressions, sections of free spans may occur. These sections are subject to a variety of forces which depend on many factors, such as the length of the section, the distance between the pipeline and seabed, currents etc. Adequate support of these free spanning sections is often required in order to maintain their stability and to reduce the risk of material fatigue and damage due to stress.

Existing technologies are based on supporting the free spans by changing the seabed topography, e.g. by rock infill and/or trenching/dredging of the shoulders of the free span, by discrete supports, or a combination of these methods. This has a huge cost, especially for long spans or for spans where there is a significant distance between the bottom depression and the pipeline. Additional vessels are also required to perform the mitigating/rectification work, which is both costly and time consuming.

Reduction or elimination of the need for intervention by conventional rock infill/trenching is hence highly desirable.

NO314056 (B1) discloses a pipeline laying method which achieves a controlled thermal expansion, limited to certain expansion loops, and thus controlled back bending in the vertical plane; this also provides possibilities of adapting the shape of the pipeline to the seabed topography in order to prevent buckling over ridges and long free spans over ditches. The pipeline is bent using the straightener system on the reel ship. However, this method is only applicable to pipelines installed by reel-lay.

SUMMARY

It is an object of the invention to reduce or eliminate the use of intervention by rock infill and/or trenching/dredging of the shoulders of the free spans.

The invention provides a new method and apparatus for laying pipelines. The method comprises, attaching a tensioning member at at least two locations along a portion of a pipeline, and attaching a buoyancy element to the tensioning member, whereby the portion of the pipeline in use is deflected.

The portion of the pipeline may be a section which spans a surface depression.

The tensioning member may be attached to the pipeline by clamps. Attachment could occur on the lay vessel, locally at the pipeline where this will be laid across the span area.

The buoyancy element may be attached to the mid-section of the tensioning member.

The buoyancy element may be attached to the tensioning member on the lay vessel, or during preparation for tow-out, or underwater.

The buoyancy element may be attached to the tensioning member by a connecting member. There may be provided a displacement control member between the tensioning member and the pipeline. The connecting member and the displacement control member may form a single member.

According to another embodiment, the buoyancy element may be arranged at the seabed. The buoyancy element may be anchored to the seabed via an anchoring member by a weight element. The weight element may be a clump weight.

The buoyancy element may be attached to the tensioning member by engaging a hook member with the tensioning member. This could be carried out by a remotely operated underwater vehicle (ROV).

There may be provided a displacement control member between the buoyancy element and the pipeline.

ROV could also be used to release the buoyancy element.

According to a further embodiment, there is provided a method wherein a tensioning member may be attached along a pipeline with local residual curvature, and a buoyancy element may be attached to the tensioning member, whereby a portion of the pipeline in use is deflected. The tensioning member may be attached to the local residual curvature section of the pipeline.

There is further provided an apparatus for pipeline laying, the apparatus comprising: a tensioning member for attaching along a portion of a pipeline at at least two locations and a buoyancy element, and a connecting member for connecting the buoyancy element to the tensioning member; whereby a portion of a pipeline in use is deflected.

The tensioning member may be a wire, a cable, a rope, a rod or similar and it may be attached to the pipeline by clamps.

According to another aspect of the invention, the apparatus may further comprise a weight element for anchoring the buoyancy element to the sea floor. The weight element may be a clump weight.

There may be provided at least one displacement control member between the tensioning member and the buoyancy element.

The apparatus may further comprise a hook member for attaching the buoyancy element to the tensioning member.

Various objects, features, aspects, and advantages of the present invention will become more apparent from the following detailed description of preferred embodiments of the invention, along with the accompanying drawings.

DRAWINGS

Embodiments of the invention will now be described with reference to the accompanying drawings, in which.

DETAILED DESCRIPTION

Figure 1:
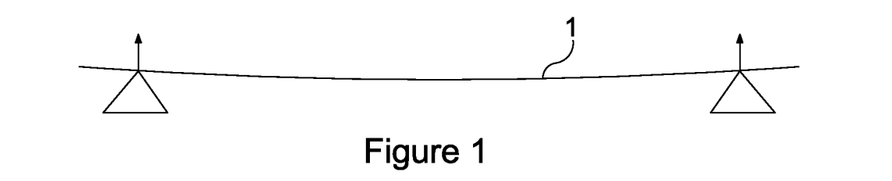
FIG. 1 shows a free spanning pipeline without the apparatus.
Figure 2:
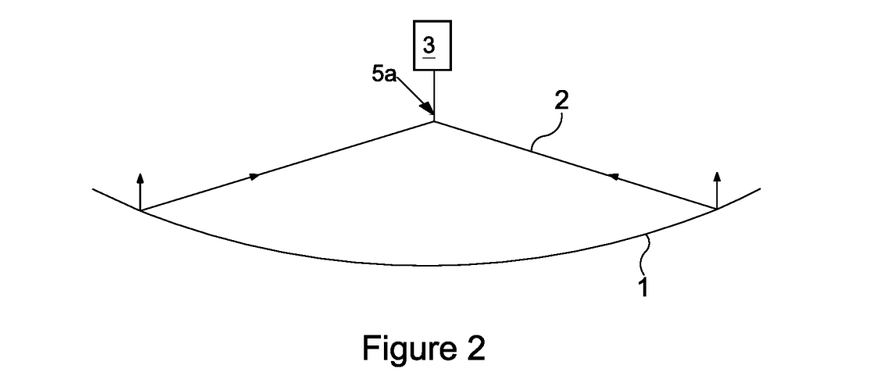
FIG. 2 shows a schematic side view of a pipeline and apparatus according to an embodiment.
Figure 3:
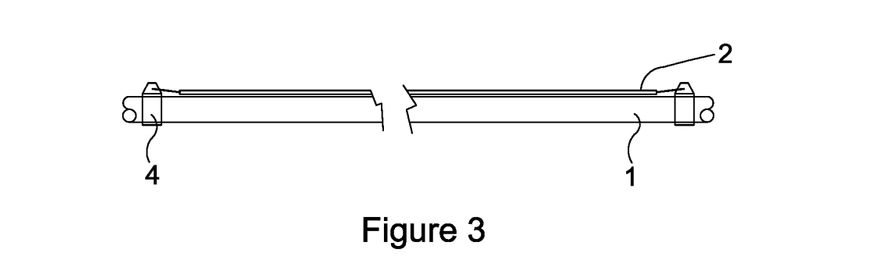
FIG. 3 shows a side view of a section of a pipeline including tensioning member attached by clamps in accordance with an embodiment.

A method and apparatus for suppressing pipeline free spans by added curvature are illustrated in the accompanying figures. As will be clear from the following discussion, the pipeline 1 is deflected during an exemplary pipeline laying process by attaching the apparatus to a portion of the pipeline 1. FIG. 1 illustrates a free spanning pipeline 1 without the support of the apparatus. FIG. 2 shows a tensioning member 2 attached (typically proximate end portions of the tensioning member) at two locations to a section of pipeline. The two attachment locations are sufficiently spaced to ensure that the tensioning member 2 is pulled taught along the section of the pipeline as shown in FIG. 3. A buoyancy element 3 is attached to the tensioning member 2 by a connecting member 5a. The buoyancy element 3 is used to create tension in the attached tensioning member 2 on the pipeline 1, whereby the pipeline 1 is forced to deflect more than otherwise given without this method, or any other special means. The added deflected shape appears once the pipeline 1 portion with the buoyancy element 3 attached is submerged. This deflection is illustrated in FIG. 2. When in place at the depression location, and following the deflection of the pipeline, the buoyancy element is released. Deflection of the pipeline suppresses free spanning sections by allowing the pipeline to follow the shape of surface depressions.

The tensioning member 2 may be an elongated member such as a wire or a cable. If the tensioning member is a rigid member it may be formed of two parts, connected by a hinge or similar to enable bending of the tensioning member.

FIG. 3 shows a tensioning member 2 attached to the pipeline by clamps 4. As shown in the figure, the tensioning member 2 can be attached to the pipeline 1 at at least two locations by clamps 4 along a portion of the pipeline 1. The clamps 4 are conveniently separated by a length approximately equal to the length of a depression across which the portion is intended to be laid. It will be appreciated by the person skilled in the art that the tensioning member 2 can be attached to the pipeline by any convenient means.

The tensioning member 2 may be attached on the lay vessel, and locally at the pipeline where the pipeline 1 will be laid across a depression.

In one embodiment, the buoyancy element 3 can be attached to the tensioning member 2 on the lay vessel, or alternatively during preparation for towing. The buoyancy element however, may also be attached to the tensioning member underwater if required.

Figure 4:
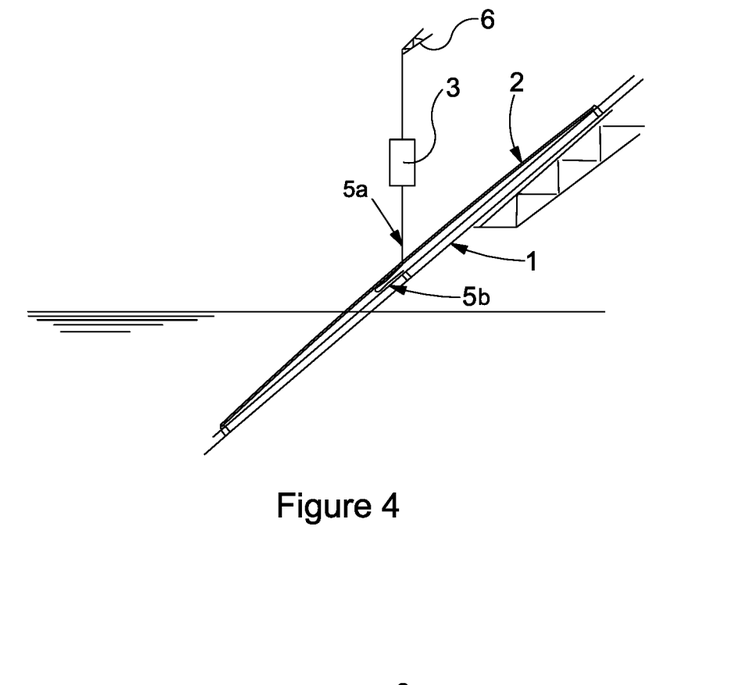
FIG. 4 shows a side view of a pipeline, crane and lay vessel in use with apparatus according to an embodiment.
Figure 5:
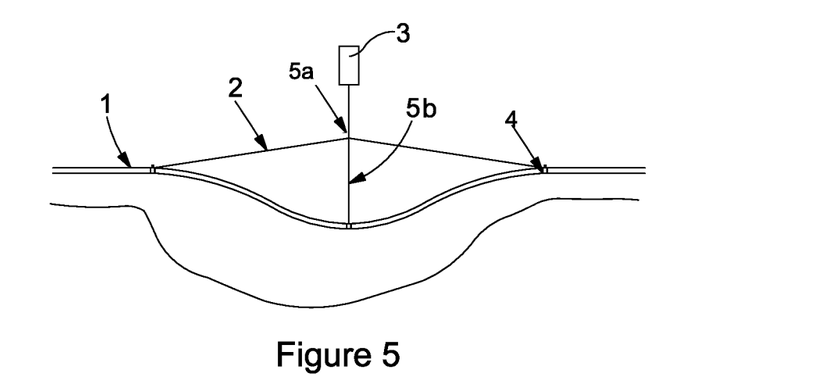
FIG. 5 illustrates a pipeline laid over a depression including apparatus in accordance with an embodiment.

In the embodiment shown in FIGS. 4 and 5, the buoyancy element 3 is attached to the tensioning member 2 at a mid-portion thereof by a connecting member 5a. Additionally, a displacement control member 5b connects the buoyancy element 3 to the pipeline 1. The displacement control element is used to control/limit the magnitude of deflection of the tensioning member (and therefore the deflection of the pipeline section) as necessary. The displacement control member 5b provides one way of controlling the degree of deflection of the pipeline section and is optional. The connecting member 5a and the displacement control member 5b can conveniently be formed from a single member fixedly attached to the tensioning member 2 at a point along the length of the single member.

FIG. 4 shows deployment of a pipeline from a lay vessel, with the apparatus attached. During overboarding from the lay vessel, the buoyancy element 3 is suspended by a vessel crane 6 and released from the crane 6 when entering the water. When submerged, the buoyancy force will tension the tensioning member 2, and the pipeline 1 will take the intended deflected shape; transferring the overall lay tension from the pipeline locally to the tensioning member 2 between the clamps 4. This is illustrated by FIG. 5.

When the pipeline 1 has been laid across the depression area with a sufficient length beyond the depression area, the buoyancy element 3 can be preferably released by a remotely operated underwater vehicle (ROV) and recovered. Sufficient length beyond the depression area is required to obtain enough friction to maintain the intended pipeline deflection in the span. The tensioning member 2, the connecting member 5a and displacement control member 5b can also be recovered as necessary.

In another embodiment of the invention, illustrated by FIGS. 6-11, the buoyancy element 1 can be pre-installed on the seabed, in a depression where the span is assumed, the buoyancy element being held in a controlled position by a weight element 11.

Figure 6:
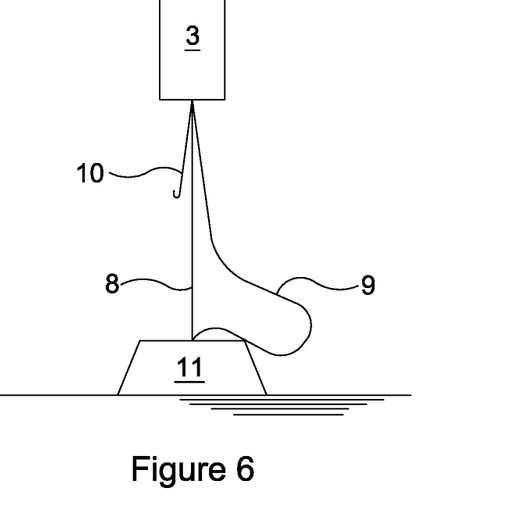
FIG. 6 shows a buoyancy element arrangement in accordance with another embodiment as arranged at the bottom of a depression.

In this embodiment, the buoyancy element 3 can form part of a buoyancy arrangement as shown in FIG. 6.

The buoyancy arrangement includes:
a buoyancy element 3;
an anchoring member 8;
a displacement control member 9;
a connection member in the form of a hook member 10;
a weight element in the form of clump weight 11;
wherein the buoyancy element 3 is anchored to the seabed via anchoring member 8 attached to clump weight 11.

In an embodiment the buoyancy element 3 is anchored to the clump weight 11 via anchoring member, 8. The hook member 10 includes a hook or alternative engagement tool for engaging with tensioning member 2.

Figure 7:
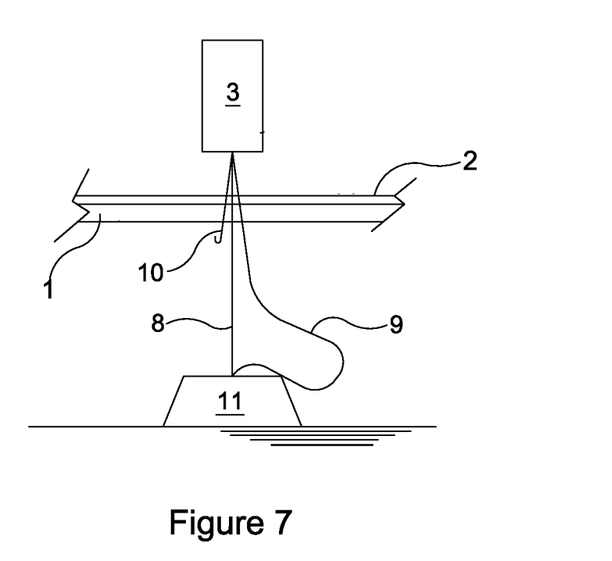
FIG. 7 shows a schematic view of the buoyancy element arrangement with a pipeline laid aside the buoyancy element arrangement.
Figure 8A:
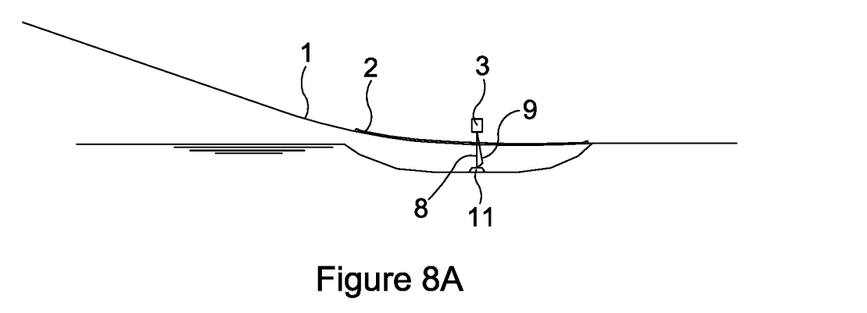
FIG. 8A shows a schematic side view of a pipeline including apparatus according an embodiment during laying across a depression.
Figure 8B:
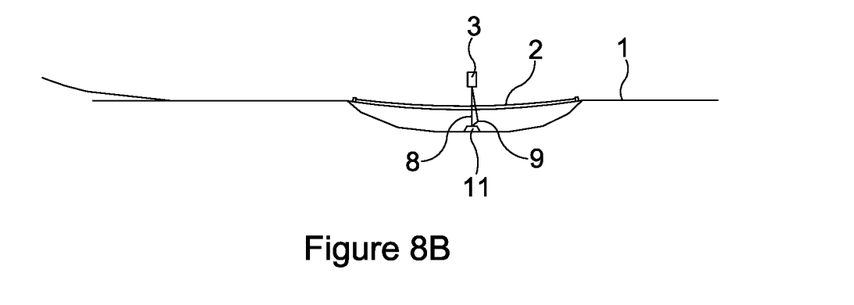
FIG. 8B shows a schematic side view of a pipeline including apparatus according to an embodiment after laying across a depression.

Referring to FIGS. 7, 8A and 8B, the pipeline section 1 is laid over the depression location, as close to the buoyancy arrangement as possible.

Figure 9:
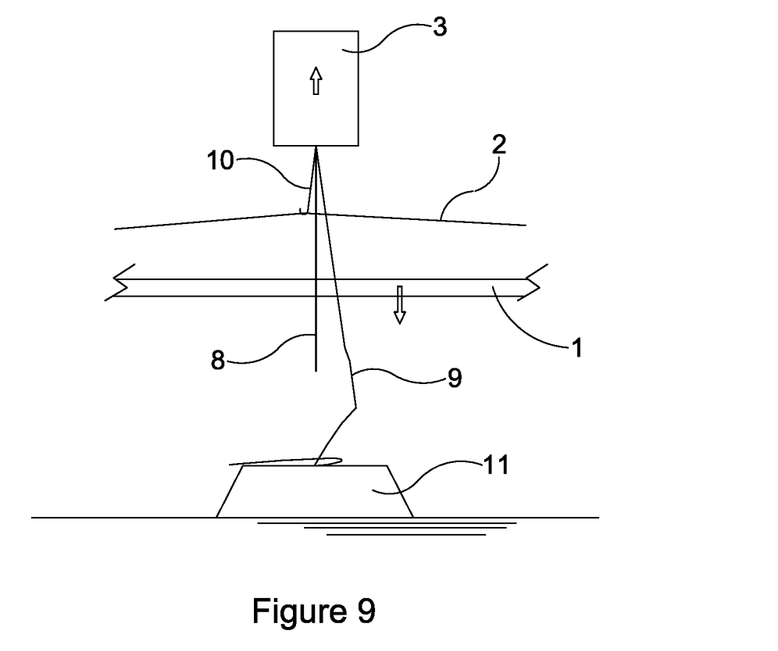
FIG. 9 illustrates deployment of apparatus according to the embodiment of FIGS. 6 to 8.

As shown in FIG. 9 when the pipeline section 1 has been laid, or is about to be laid, across the span area, the buoyancy element 3 is deployed by cutting anchoring member 8, and engaging hook member 10 with the tensioning member 2. Conveniently, this is undertaken by a remotely operated underwater vehicle (ROV) after the lay vessel has halted. Upward travel of the buoyancy element 3 is restricted by displacement control member 9 connected between the clump weight and the buoyancy element.

Figure 10:
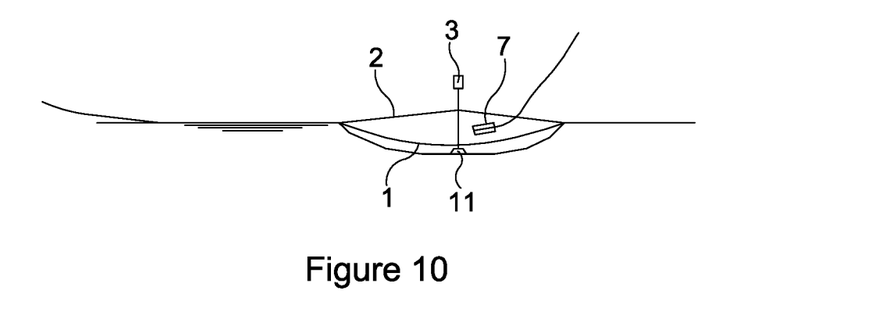
FIG. 10 illustrates the apparatus and a section of pipeline after deployment.

As illustrated in FIG. 10, following engagement of hook member 10 with tensioning member 2 by ROV 7, the tensioning member 2 is tensioned, and deflection of the attached pipeline 1 occurs. As a result, the spanning pipeline 1 is forced to deflect further towards the bottom of the depression, thereby reducing or eliminating the need for and/or the amount of intervention required.

As the pipe is deflected into the depression area, the gap between the pipe and the seabed reduces. The extent of lowering can be controlled by the travel allowed and predetermined for the buoyancy element 3 by displacement control member 9. Accordingly displacement control member 9 can be used to control/limit the magnitude of deflection of the pipeline 1.

Figure 11:
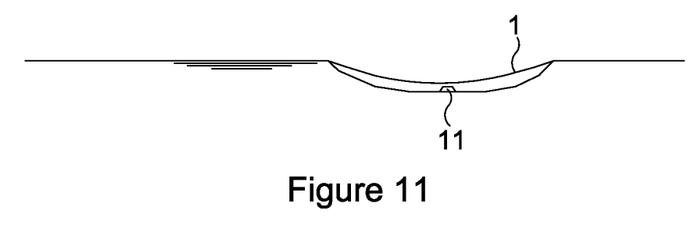
FIG. 11 shows a section of pipeline laid in accordance with an embodiment.

The pipe laying process can be resumed, and sufficient length beyond the depression area can be laid to obtain adequate friction force to the pipeline in order to maintain the intended span deflection. The buoyancy element 3 can then be fully released from the weight element by cutting displacement control member 9. This can be preferably achieved by ROV 7. The tensioning member 2, and displacement control members 8 9 can remain in their positions or can be recovered by an ROV 7 as required.

The Invention is also applicable for pipelines installed both by reel-lay, J-lay, S-lay and Tow-out.

In a further embodiment, the apparatus can be implemented on a pipeline with local residual curvature, such as described by NO314056 (B1). By attaching the tensioning member 2 along a pipeline at the local residual curvature section, and then attaching the buoyancy element 3 to the tensioning member 2, additional sagging of the pipeline into a span can be created.

Alternatively, even more deflection than can be obtained by the described methods can be achieved by adding external weight to the pipeline at the span location.

The Invention could typically be of interest to apply for particularly great spans (i.e. with long length and large distance between bottom depression to pipeline (gaps)) which otherwise would call for extensive intervention by the rock infill and or trenching.

The Invention may, in some cases, also allow for optimization/reduction of the overall pipeline route length and thereby actual pipeline length. Projects challenged with particularly uneven seafloor, typically areas with heavy iceberg scouring, would otherwise be rerouted to minimize conventional intervention.

It will be appreciated by the person of skill in the art that various modifications may be made to the above-described embodiments without departing from the scope of the present invention.

The invention claimed is:

1. A method of laying a pipeline on a seabed, comprising:
   attaching at least one tensioning member to a pipeline, wherein each tensioning member is connected at two locations defining a portion of the pipeline; and
   attaching a buoyancy element to said at least one tensioning member at a portion of said at least one tensioning member between said two locations,
   wherein the portion of the pipeline is a portion which, in use, spans a depression in a seabed surface, whereby said portion of the pipeline in use is deflected into the depression.

2. The method according to claim 1, wherein the tensioning member is attached to the pipeline by clamps.

3. The method according to claim 1, wherein the tensioning member is attached during the pipeline laying on the lay vessel.

4. The method according to claim 1, wherein the buoyancy element is attached at a mid-section of the tensioning member.

5. The method according to claim 1, wherein the buoyancy element is attached to the tensioning member on the lay vessel.

6. The method according to claim 1, wherein the buoyancy element is attached to the tensioning member during preparation for tow-out.

7. The method according to claim 1, wherein the buoyancy element is attached to the tensioning member underwater.

8. The method according to claim 1, wherein the buoyancy element is attached to the tensioning member via a connecting member.

9. The method according to claim 1, wherein there is provided a displacement control member between the tensioning member and the pipeline.

10. The method according to claim 9, wherein the connecting member and the displacement control member form a single member.

11. The method according to claim 1, wherein prior to attachment to the tensioning member, the buoyancy element is arranged at the seabed.

12. The method according to claim 11, wherein the buoyancy element is anchored to the seabed via an anchoring member by a weight element.

13. The method according to claim 12, wherein the weight element is a clump weight.

14. The method according to claim 11, wherein the buoyancy element is attached to the tensioning member by engaging a hook member with the tensioning member.

15. The method according to claim 11, wherein there is provided a displacement control member between the buoyancy element and the pipeline.

16. The method according to claim 11, wherein the buoyancy element is attached to the tensioning member with the use of a remotely operated underwater vehicle.

17. The method according to claim 1, wherein the buoyancy element is released by a remotely operated underwater vehicle.

18. The method according to claim 1, wherein the pipeline has local residual curvature.

19. The method according to claim 18, wherein the tensioning member is attached at the local residual curvature section.

20. The method according to claim 1, wherein the pipeline in use is deflected into the depression by a buoyancy force caused by the buoyancy element entering the water.

* * * * *